United States Patent
Azadet et al.

(10) Patent No.: US 12,261,637 B2
(45) Date of Patent: Mar. 25, 2025

(54) METHOD AND APPARATUS FOR MEASURING AND CANCELLING LOCAL OSCILLATOR FEEDTHROUGH USING AN OBSERVATION RECEIVER

(71) Applicant: Intel Corporation, Santa Clara, CA (US)

(72) Inventors: Kameran Azadet, San Ramon, CA (US); Marc Jan Georges Tiebout, Finkenstein (AT)

(73) Assignee: Intel Corporation, Santa Clara, CA (US)

( * ) Notice: Subject to any disclaimer, the term of this patent is extended or adjusted under 35 U.S.C. 154(b) by 761 days.

(21) Appl. No.: 17/358,040

(22) Filed: Jun. 25, 2021

(65) Prior Publication Data
US 2022/0416822 A1   Dec. 29, 2022

(51) Int. Cl.
*H04B 1/04* (2006.01)
*H04L 5/12* (2006.01)
*H04L 25/06* (2006.01)

(52) U.S. Cl.
CPC ... *H04B 1/0475* (2013.01); *H04B 2001/0433* (2013.01)

(58) Field of Classification Search
None
See application file for complete search history.

(56) References Cited

U.S. PATENT DOCUMENTS

| | | | | |
|---|---|---|---|---|
| 5,559,468 A | * | 9/1996 | Gailus | H03F 1/34 330/110 |
| 5,793,817 A | * | 8/1998 | Wilson | H03C 3/406 375/297 |
| 6,868,128 B1 | * | 3/2005 | Lane | H04B 1/30 375/319 |
| 7,206,557 B2 | * | 4/2007 | Aytur | H04B 1/0475 455/118 |
| 7,440,732 B2 | * | 10/2008 | Pan | H04B 1/0475 455/114.2 |
| 7,778,352 B2 | * | 8/2010 | Jensen | H03C 5/00 455/114.2 |
| 7,961,812 B2 | * | 6/2011 | Jensen | H03C 5/00 455/114.2 |

(Continued)

*Primary Examiner* — Tuan A Tran
(74) *Attorney, Agent, or Firm* — 2SPL Patent Attorneys PartG mbB; Yong Beom Hwang

(57) ABSTRACT

A method and apparatus for cancelling local oscillator feedthrough (LOFT). A transmitter includes a first mixer configured to mix a transmit signal with a first local oscillator signal. An observation receiver receives a fraction of a power of the transmit signal as a feedback signal and processes the feedback signal. The observation receiver includes a second mixer configured to mix the feedback signal with a second local oscillator signal. A LOFT correction estimation circuitry is configured to determine a DC offset to cancel LOFT at the first mixer in the transmitter based on measurements on outputs of the second mixer. An LOFT correction circuitry is configured to add the DC offset to the transmit signal. The LOFT correction estimation circuitry may determine the DC offset based on several measurements obtained by varying the DC offset and a phase shift in the second local oscillator signal in the observation receiver.

18 Claims, 6 Drawing Sheets

(56) References Cited

U.S. PATENT DOCUMENTS

| | | | | |
|---|---|---|---|---|
| 7,965,994 | B2* | 6/2011 | Darabi | H04B 1/30 |
| | | | | 455/208 |
| 8,364,100 | B2* | 1/2013 | Pan | H04B 1/525 |
| | | | | 455/284 |
| 8,836,374 | B2* | 9/2014 | Hadji-Abdolhamid | |
| | | | | H03F 3/45179 |
| | | | | 327/54 |
| 8,913,968 | B2* | 12/2014 | Mirzaei | H04B 1/0475 |
| | | | | 455/114.1 |
| 9,166,839 | B2* | 10/2015 | Plevel | H04L 25/03159 |
| 9,692,473 | B2* | 6/2017 | Gard | H04B 1/18 |
| 10,728,067 | B1* | 7/2020 | Cattivelli | H04W 56/0035 |
| 10,812,294 | B2* | 10/2020 | Tangudu | H04L 25/022 |
| 11,063,618 | B2* | 7/2021 | Venkatraman | H04L 25/0202 |
| 11,177,771 | B2* | 11/2021 | Ezz | H03D 7/1466 |

\* cited by examiner

METHOD AND APPARATUS FOR MEASURING AND CANCELLING LOCAL OSCILLATOR FEEDTHROUGH USING AN OBSERVATION RECEIVER

FIELD

Examples relate to a transceiver, more particularly, a method and apparatus for measuring and cancelling local oscillator feedthrough (LOFT) using an observation receiver.

BACKGROUND

A radio frequency (RF) mixer is a non-linear electrical device that generates new frequencies from two input signals. An RF mixer has two input ports and one output port. The ideal mixer would produce an output that is a product of the two inputs. A local oscillator (LO) signal, which drives the mixer, may be leaked to the mixer's output port, which is called LO feedthrough (LOFT). LOFT appears as a spur in the transmitter possibly in the middle of the signal in zero intermediate frequency (ZIF) architecture.

The LOFT can be cancelled by applying a DC offset to the transmitter's input. To cancel or correct the LOFT, its amplitude and phase need to be correctly measured using an observation receiver (e.g., a main receiver) which usually has a DC offset that can overlap with the LOFT if the observation receiver LO is at the same frequency as the transmitter LO.

FIG. 1 shows a convention scheme for LOFT correction based on power detection. The transmit signal after mixing by a mixer 104 is tapped onto the observation receiver and a power detector 112 and power minimization algorithm 114 are used to determine the DC offset (d) 116 to be added to the transmit signal 102. In this conventional scheme, an auxiliary analog-to-digital converter (ADC) and a power meter are used to minimize the power. However, this scheme requires extra analog circuitry and does not work well when the transmitter is active. When a transmitter is active, the main receiver is usually inactive and may be used for observation, which holds true e.g., for 5G mmWave systems. Alternatively, a feedback receiver, often already existent for DPD purposes, can be used.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
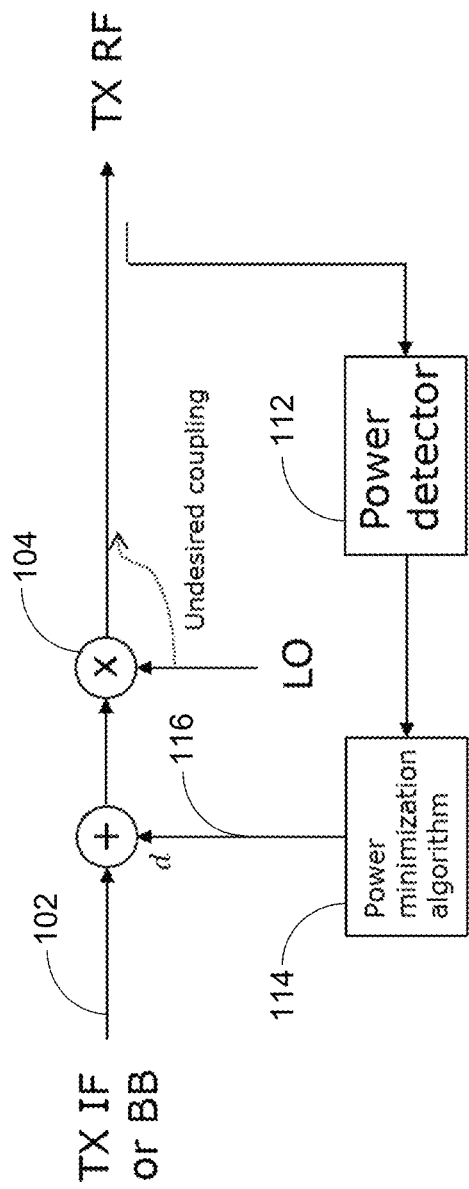
FIG. 1 shows a convention scheme for LOFT correction based on power detection.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Examples are disclosed for measuring and cancelling the LOFT using an observation receiver in a transceiver. Examples disclosed herein introduce some extra degrees of freedom to be able to distinguish the LOFT from the receiver DC offset, and measure accurately, and cancel correctly, the LOFT. In the examples disclosed herein the LOFT can be distinguished in the presence of the DC offset in the observation receiver. In the case of ZIF or low intermediate frequency (IF), the system may not work without LOFT correction. In the case of high IF, filtering can be done, but by correcting the LOFT, the image filter can be relaxed as the image is further out in frequency than the LOFT spur.

Figure 2:
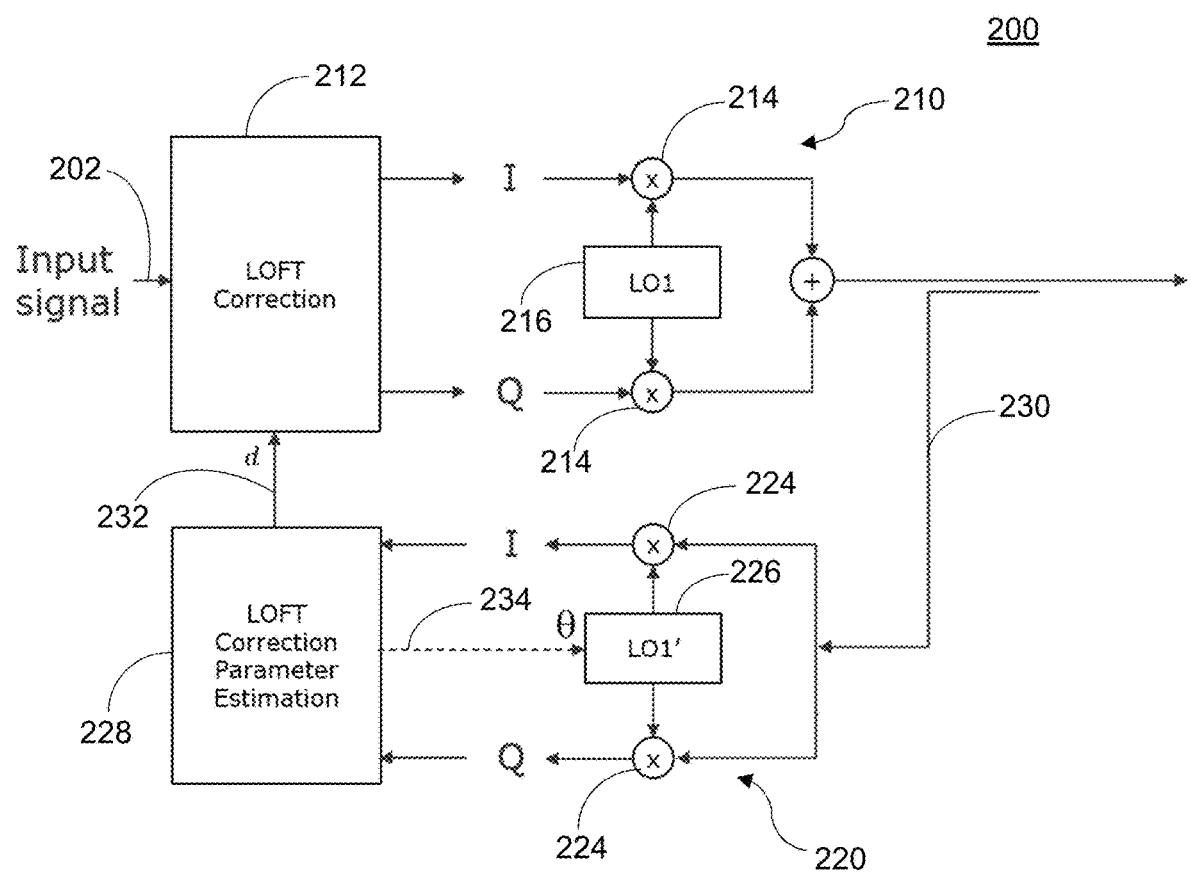
FIG. 2 is a block diagram of an example apparatus configured to measure and cancel the LOFT using an observation receiver in accordance with one example.

FIG. 2 is a block diagram of an example apparatus 200 configured to measure and cancel the LOFT using an observation receiver in accordance with one example. The apparatus 200 includes a transmitter 210 and an observation receiver 220. The observation receiver 220 may be a main receiver or a separate receiver dedicated for this purpose.

In the transmitter 210, the input signal 202 (the transmit signal) is mixed with an LO signal 216 by a mixer 214 for up-conversion e.g., to RF. The mixer 214 may be a quadrature mixer (as shown in FIG. 2) or a single sideband mixer. LOFT may occur through the mixer 214 such that the LO signal 216 may appear on the output of the mixer 214.

A fraction of the power of the up-converted input signal is tapped to an observation receiver 220 as a feedback signal 230 and the observation receiver 220 processes the feedback signal 230. The observation receiver 220 includes a mixer 224 to mix the feedback signal 230 with an LO signal 226. The LO signal 216 and the LO signal 226 may be in the same frequency but the phase of the LO signal 226 is shifted by θ, which is determined by the LOFT correction parameter estimation circuitry 228.

The LOFT correction parameter estimation circuitry 228 determines a DC offset (d) 232 to cancel/correct the LOFT occurred at the mixer 214 in the transmitter 210 based on the measurements on the outputs of the mixer 224, which will be explained in detail below. The LOFT correction circuitry 212 adds the DC offset to the transmit signal 202 to correct the LOFT occurred through the mixer 214.

The transmit signal is written as follows:

$$TX = \text{Re}((x+d)e^{j\omega_{LO}t} + |a|e^{j(\omega_{LO}t+\phi)}), \quad \text{Equation (1)}$$

where x is a transmit RF signal, d is a DC correction (DC offset) to be determined/optimized to cancel the LOFT, and a represents the LOFT at the transmitter mixer 214.

Let $a = |a|e^{j\phi}$ and $\alpha = \arg(x+d+a)$.

$$x+d+a = |x+d+a|e^{j\alpha}. \quad \text{Equation (2)}$$

Equation (1) is rewritten as follows:

$$TX = \text{Re}(|x+d+a|e^{j(\omega_{LO}t+\alpha)}) = |x+d+a|\cdot\cos(\omega_{LO}t+\alpha). \quad \text{Equation (3)}$$

An average power of the transmit signal can be written as:

$$P_{average} = \overline{TX^2} \overline{\text{Re}(|x+d+a|e^{j(\omega_{LO}t+\alpha)})^2} = \overline{|x+d+a|^2 \cdot \cos^2(\omega_{LO}t+\alpha)}. \quad \text{Equation (4)}$$

Assuming the RF bandwidth<<the LO center frequency (such that the envelope can be considered constant over a period of LO), Equation (4) can be further simplified as follows:

$$P_{average} \approx \overline{|x+d+a|^2} \cdot \overline{\cos^2(\omega_{LO}t+\alpha)}. \quad \text{Equation (5)}$$

$$\cos(2\theta) = 2\cos^2(\theta) - 1 \Rightarrow \cos^2(\theta) = \frac{1}{2}\cos(2\theta) + \frac{1}{2} \Rightarrow \overline{\cos^2(\theta)} = \frac{1}{2}.$$

Equation (5) can be written as:

$$P_{average} \approx \frac{1}{2}\overline{|x+d+a|^2} = \frac{1}{2}\overline{(x+d+a)(x+d+a)^*} = \quad \text{Equation (6)}$$

$$\frac{1}{2}\overline{(|x|^2 + x(d+a)^* + x^*(d+a) + |d+a|^2)}.$$

$$P_{average} \approx \frac{1}{2}x_{RMS}^2 + \frac{1}{2}|d+a|^2. \quad \text{Equation (7)}$$

Equation (7) is written as a function of d as follows:

$$f(d) = \frac{1}{2}x_{RMS}^2 + \frac{1}{2}|d+a|^2. \quad \text{Equation (8)}$$

If $x_{RMS}^2 = 0$ (i. e., no transmit signal), $$f(d) = \frac{1}{2}|d+a|^2.$$

$$\min_d f(d) = 0.$$

$$d_{opt} = \arg\min_d f(d) = -a.$$

If $x_{RMS}^2 >> |a|^2$ (i. e., transmitter is active), $$f(d) = \frac{1}{2}x_{RMS}^2 + \frac{1}{2}|d+a|^2,$$

$$\frac{1}{2}x_{RMS}^2 >> \frac{1}{2}|d+a|^2.$$

Figure 3A:
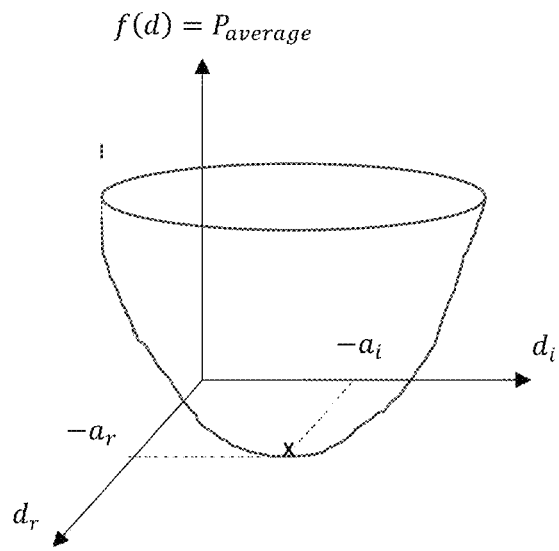
FIGS. 3A and 3B show the average transmit power measured during the time that there is no transmission and there is transmission, respectively.
Figure 3B:
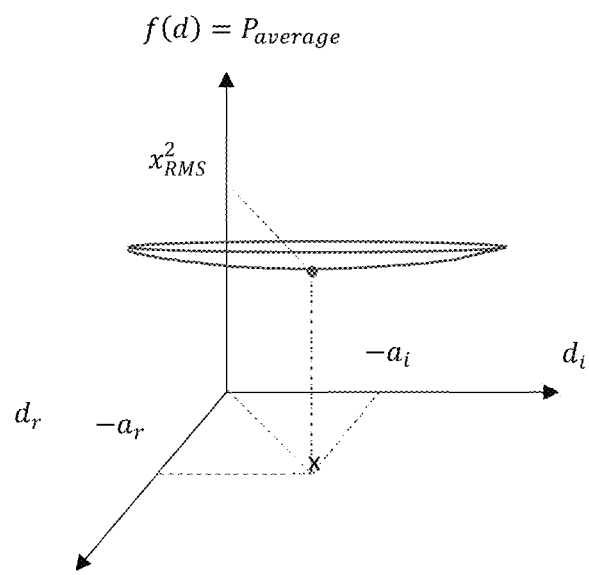

The average TX power may be measured during the time that there is no transmission, as shown in FIG. 3A. This scheme may use a very low-speed ADC as a constant voltage is measured and DC in ADC does not change the optimum location. However, when a TX is active (when there is a transmission), varying d results in small power change as shown in FIG. 3B, which is difficult to measure.

Conventional scheme uses an auxiliary ADC and a power meter to measure the LO feedthrough. However, as shown above, this scheme requires extra analog circuitries and does not work well when the transmitter is active.

In accordance with some examples, an observation receiver is used to measure and cancel the LO feedthrough. The transmit signal is written as:

$$TX = |x+d+a|\cdot\cos(\omega_{LO}t+\alpha). \quad \text{Equation (9)}$$

The transmit signal after the mixer 214 is tapped as a feedback signal and provided to the observation receiver 220. The transmit signal (i.e., the feedback signal) is mixed with the LO signal 226 with the mixer 224 in the observation receiver 220. The RX mixer output in the observation receiver 220 after mixing with the LO signal 226 and filtering are written as:

$$RX_{mixer_{output}} = |x+d+a|\cdot\cos(\omega_{LO}t+\alpha)\cdot e^{-j(\omega_{LO}t+\theta+\delta)} + d'. \quad \text{Equation (10)}$$

$$RX_{mixer_{output}} = \quad \text{Equation (11)}$$

$$|x+d+a|\cdot\left(\frac{e^{j(\omega_{LO}t+\alpha)} + e^{-j(\omega_{LO}t+\alpha)}}{2}\right)\cdot e^{-j(\omega_{LO}t+\theta+\delta)} + d'.$$

$$RX_{mixer_{filtered_{output}}} = \quad \text{Equation (12)}$$

$$\frac{1}{2}|x+d+a|\cdot e^{j(\alpha-\theta+\delta)} + d' = \frac{1}{2}(x+d+a)e^{-j(\theta+\delta)} + d'.$$

θ is the phase shift introduced to the local oscillator signal 226 in the observation receiver. δ is a phase mismatch error of the observation receiver mixer 224. d' is the DC offset at the observation receiver 220. There is an unknown phase error between the transmitter 210 and the observation receiver 220.

The average of the observation receiver mixer filtered output is written as:

$$\overline{RX} = f(\theta) = \frac{1}{2}(d+a)e^{-j(\theta+\delta)} + d'. \quad \text{Equation (13)}$$

In examples, the DC offset to cancel the LO feedthrough in the transmitter mixer 214 is determined based on the measurements of f(θ) in Equation (13). f(.) is a measurement of average or DC for a given constant phase shift θ and x is assumed to be 0 DC. The constant phase shift θ is controlled by the LOFT correction parameter estimation circuitry 228 as shown by the signal 234 in FIG. 2. For example, the measurements of f(θ) may be made with different values of θ and/or d, for example θ of 0 and π and d of 0 and $d_0$ as follows:

$$\theta = 0 \Rightarrow f(0) = \frac{1}{2}(d+a)e^{-j\delta} + d'. \quad \text{Equation (14)}$$

$$\theta = \pi \Rightarrow f(\pi) = -\frac{1}{2}(d+a)e^{-j\delta} + d'. \quad \text{Equation (15)}$$

Alternatively, instead of measuring f(θ) with a phase shift θ=π, the feedback signal 230 may be inverted before entering the observation receiver 220, i.e., the feedback signal and the inverted feedback signal may be measured with different d values.

From Equations (14) and (15), $$d + a = (f(0) - f(\pi))e^{+j\delta}. \quad \text{Equation (16)}$$

$$d = 0 \Rightarrow a = (f_{d=0}(0) - f_{d=0}(\pi))e^{+j\delta}. \quad \text{Equation (17)}$$

$$d = d_0 \Rightarrow d_0 = (f_{d=d_0}(0) - f_{d=d_0}(\pi))e^{+j\delta} - a = \quad \text{Equation (18)}$$
$$(f_{d=d_0}(0) - f_{d=d_0}(\pi) - f_{d=0}(0) + f_{d=0}(\pi))e^{+j\delta} \Rightarrow e^{-j\delta} =$$
$$\frac{1}{d_0}(f_{d=d_0}(0) - f_{d=d_0}(\pi) - f_{d=0}(0) + f_{d=0}(\pi)).$$

$$a = \frac{1}{d_0^*}(f_{d=0}(0) - f_{d=0}(\pi)) \quad \text{Equation (19)}$$
$$(f_{d=d_0}(0) - f_{d=d_0}(\pi) - f_{d=0}(0) + f_{d=0}(\pi))^*.$$

The optimum DC offset ($d_{opt}$) to cancel the LO feedthrough is determined as:

$$d_{opt} = -a. \quad \text{Equation (20)}$$

Figure 4:
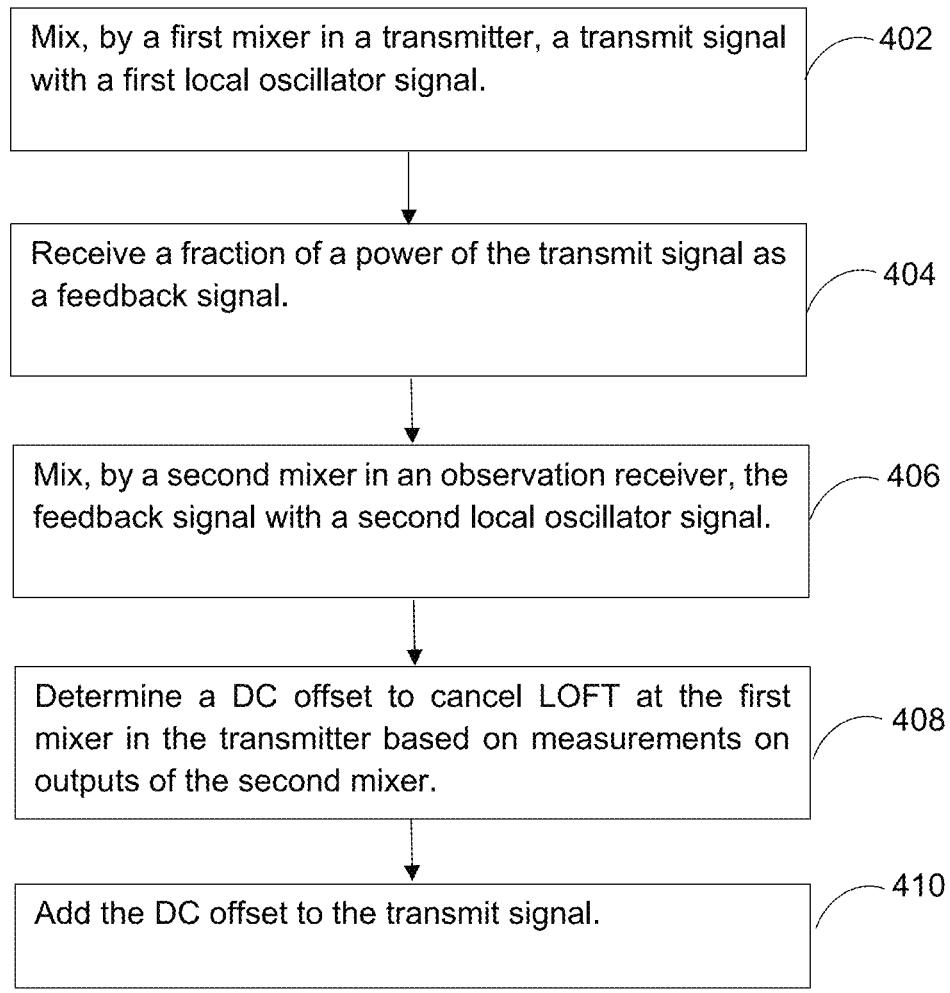
FIG. 4 is a flow diagram of an example process for cancelling LOFT in accordance with one example.

FIG. 4 is a flow diagram of an example process for cancelling LOFT in accordance with one example. The method includes mixing, by a first mixer in a transmitter, a transmit signal with a first local oscillator signal (402). The method includes receiving a fraction of a power of the transmit signal as a feedback signal (404). The method includes mixing, by a second mixer in an observation receiver, the feedback signal with a second local oscillator signal (406). The method includes determining a DC offset to cancel LOFT at the first mixer in the transmitter based on measurements on outputs of the second mixer (408). The method includes adding the DC offset to the transmit signal (410). The DC offset may be determined based on several measurements obtained by varying the DC offset and/or a phase shift in the second local oscillator signal in the observation receiver. The DC offset may be varied to be a zero and a non-zero value. The phase shift in the second oscillator signal may be, for example, zero or 180 degrees.

Figure 5:
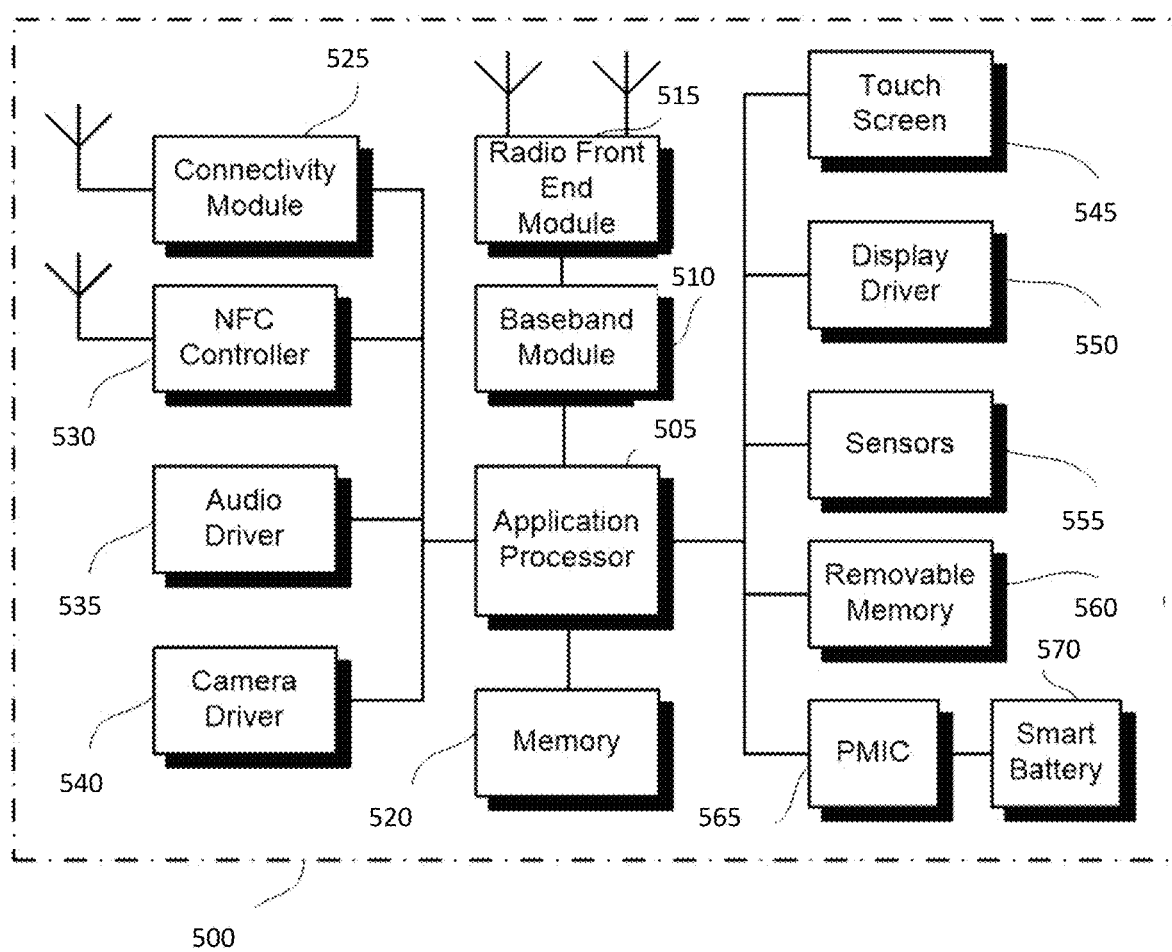
FIG. 5 illustrates a user device in which the examples disclosed herein may be implemented.

FIG. 5 illustrates a user device 500 in which the examples disclosed herein may be implemented. For example, the examples disclosed herein may be implemented in the radio front-end module 515, in the baseband module 510, etc. The user device 500 may be a mobile device in some aspects and includes an application processor 505, baseband processor 510 (also referred to as a baseband module), radio front end module (RFEM) 515, memory 520, connectivity module 525, near field communication (NFC) controller 530, audio driver 535, camera driver 540, touch screen 545, display driver 550, sensors 555, removable memory 560, power management integrated circuit (PMIC) 565 and smart battery 570.

In some aspects, application processor 505 may include, for example, one or more CPU cores and one or more of cache memory, low drop-out voltage regulators (LDOs), interrupt controllers, serial interfaces such as serial peripheral interface (SPI), inter-integrated circuit (I2C) or universal programmable serial interface module, real time clock (RTC), timer-counters including interval and watchdog timers, general purpose input-output (TO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 510 may be implemented, for example, as a solder-down substrate including one or more integrated circuits, a single packaged integrated circuit soldered to a main circuit board, and/or a multi-chip module containing two or more integrated circuits.

Figure 6:
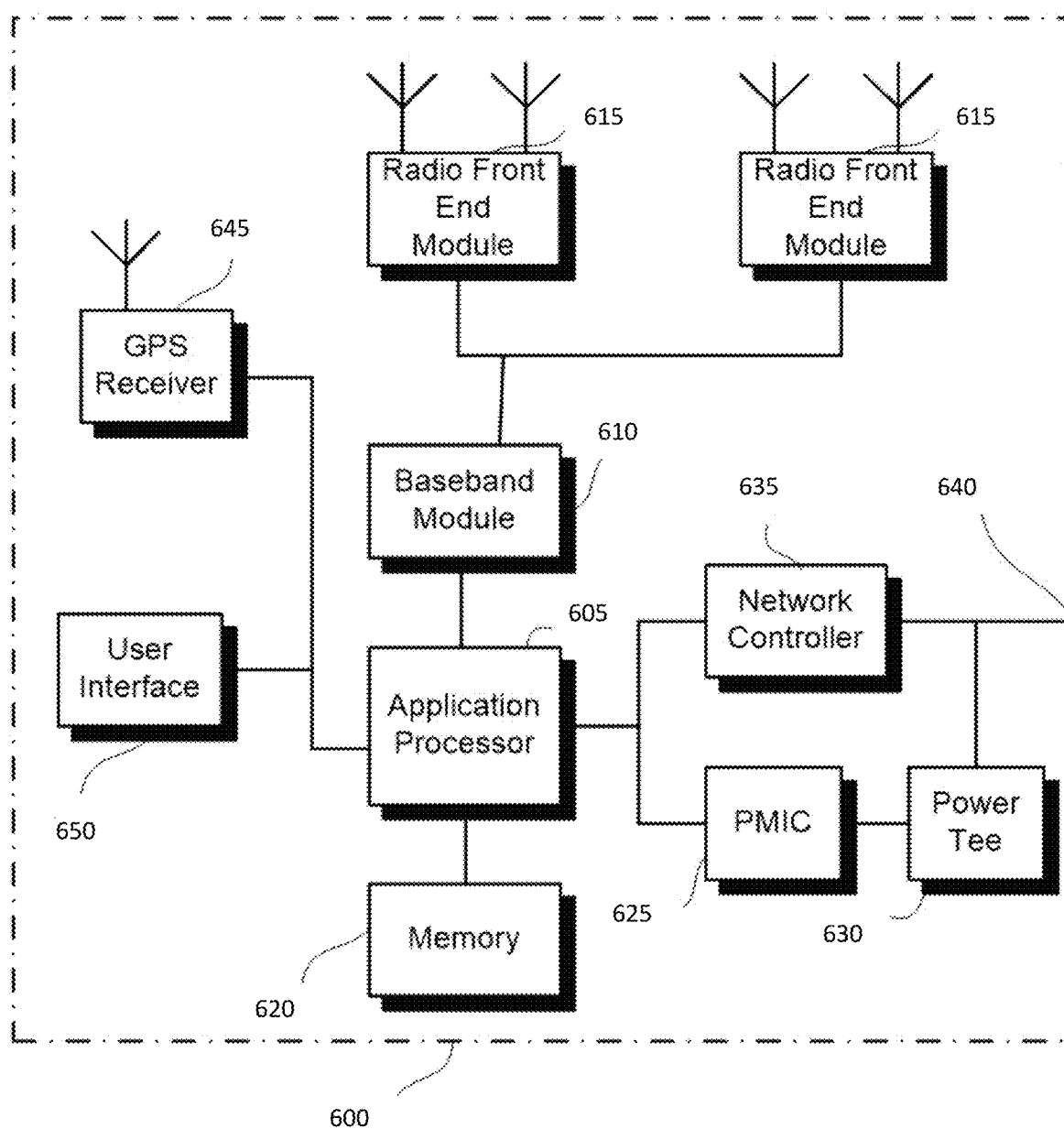
FIG. 6 illustrates a base station or infrastructure equipment radio head in which the examples disclosed herein may be implemented.

FIG. 6 illustrates a base station or infrastructure equipment radio head 600 in which the examples disclosed herein may be implemented. For example, the examples disclosed herein may be implemented in the radio front-end module 615, in the baseband module 610, etc. The base station radio head 600 may include one or more of application processor 605, baseband modules 610, one or more radio front end modules 615, memory 620, power management circuitry 625, power tee circuitry 630, network controller 635, network interface connector 640, satellite navigation receiver module 645, and user interface 650.

In some aspects, application processor 605 may include one or more CPU cores and one or more of cache memory, low drop-out voltage regulators (LDOs), interrupt controllers, serial interfaces such as SPI, I2C or universal programmable serial interface module, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 610 may be implemented, for example, as a solder-down substrate including one or more integrated circuits, a single packaged integrated circuit soldered to a main circuit board or a multi-chip module containing two or more integrated circuits.

In some aspects, memory 620 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto resistive random access memory (MRAM) and/or a three-dimensional crosspoint memory. Memory 620 may be implemented as one or more of solder down packaged integrated circuits, socketed memory modules and plug-in memory cards.

In some aspects, power management integrated circuitry 625 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 630 may provide for electrical power drawn from a network cable to provide both power supply and data connectivity to the base station radio head 600 using a single cable.

In some aspects, network controller 635 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 645 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 645 may provide data to application processor 605 which may include one or more of position data or time data. Application processor 605 may use time data to synchronize operations with other radio base stations.

In some aspects, user interface 650 may include one or more of physical or virtual buttons, such as a reset button, one or more indicators such as light emitting diodes (LEDs) and a display screen.

Another example is a computer program having a program code for performing at least one of the methods described herein, when the computer program is executed on a computer, a processor, or a programmable hardware component. Another example is a machine-readable storage including machine readable instructions, when executed, to implement a method or realize an apparatus as described herein. A further example is a machine-readable medium including code, when executed, to cause a machine to perform any of the methods described herein.

The examples as described herein may be summarized as follows.

An example (e.g., example 1) relates to an apparatus configured to cancel LOFT. The apparatus includes a transmitter configured to process a transmit signal, the transmitter including a first mixer configured to mix the transmit signal with a first local oscillator signal; an observation receiver configured to receive a fraction of a power of the transmit signal as a feedback signal and process the feedback signal, the receiver including a second mixer configured to mix the feedback signal with a second local oscillator signal; an LOFT correction estimation circuitry configured to determine a DC offset to be added to the transmit signal to cancel LOFT at the first mixer in the transmitter based on measurements on outputs of the second mixer; and an LOFT correction circuitry configured to add the DC offset to the transmit signal.

Another example (e.g., example 2) relates to a previously described example (e.g., example 1), wherein the LOFT correction estimation circuitry is configured to determine the DC offset based on several measurements obtained by varying the DC offset and/or a phase shift in the second local oscillator signal in the observation receiver.

Another example (e.g., example 3) relates to a previously described example (e.g., example 2), wherein the DC offset is varied to be a zero and a non-zero value for the measurements on outputs of the second mixer.

Another example (e.g., example 4) relates to a previously described example (e.g., any one of examples 2-3), wherein the phase shift in the second oscillator signal is varied to be zero or 180 degrees for the measurements on outputs of the second mixer.

Another example (e.g., example 5) relates to a previously described example (e.g., any one of examples 2-4), wherein the measurements are made on the feedback signal and an inverted feedback signal.

Another example (e.g., example 6) relates to a previously described example (e.g., any one of examples 1-5), wherein the first mixer is a quadrature mixer.

Another example (e.g., example 7) relates to a previously described example (e.g., any one of examples 1-6), wherein the first mixer is a single sideband mixer.

Another example (e.g., example 8) relates to a previously described example (e.g., any one of examples 1-7), wherein the LOFT correction estimation circuitry is configured to determine the DC offset based on average of the measurements on outputs of the second mixer.

Another example (e.g., example 9) relates to a previously described example (e.g., any one of examples 1-8), wherein the observation receiver is a main receiver.

Another example (e.g., example 10) relates to a previously described example (e.g., any one of examples 1-9), wherein the observation receiver is a separate receiver dedicated for adaptation purpose.

Another example (e.g., example 11) relates to a method for cancelling LOFT. The method includes mixing, by a first mixer in a transmitter, a transmit signal with a first local oscillator signal; receiving a fraction of a power of the transmit signal as a feedback signal; mixing, by a second mixer in an observation receiver, the feedback signal with a second local oscillator signal; determining a DC offset to cancel LOFT at the first mixer in the transmitter based on measurements on outputs of the second mixer; and adding the DC offset to the transmit signal.

Another example (e.g., example 12) relates to a previously described example (e.g., example 11), wherein the DC offset is determined based on several measurements obtained by varying the DC offset and/or a phase shift in the second local oscillator signal in the observation receiver.

Another example (e.g., example 13) relates to a previously described example (e.g., example 12), wherein the DC offset is varied to be a zero and a non-zero value for the measurements on outputs of the second mixer.

Another example (e.g., example 14) relates to a previously described example (e.g., any one of examples 12-13), wherein the phase shift in the second oscillator signal is varied to be zero or 180 degrees for the measurements on outputs of the second mixer.

Another example (e.g., example 15) relates to a previously described example (e.g., any one of examples 12-14), wherein the measurements are made on the feedback signal and an inverted feedback signal.

Another example (e.g., example 16) relates to a previously described example (e.g., any one of examples 11-15), wherein the first mixer is either a quadrature mixer or a single sideband mixer.

Another example (e.g., example 17) relates to a previously described example (e.g., any one of examples 11-16), wherein the DC offset is determined based on average of the measurements on outputs of the second mixer.

Another example (e.g., example 18) relates to a previously described example (e.g., any one of examples 11-17), wherein the observation receiver is a main receiver.

Another example (e.g., example 19) relates to a previously described example (e.g., any one of examples 11-18), wherein the observation receiver is a separate receiver dedicated for adaptation purpose.

Another example (e.g., example 20) relates to a non-transitory machine-readable medium including code, when executed, to cause a machine to perform a method of any one of examples 11-19.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

The invention claimed is:

1. An apparatus configured to cancel local oscillator feedthrough (LOFT), comprising:
    a transmitter configured to process a transmit signal, the transmitter including a first mixer configured to mix the transmit signal with a first local oscillator signal;
    an observation receiver configured to receive a fraction of a power of the transmit signal as a feedback signal and process the feedback signal, the receiver including a second mixer configured to mix the feedback signal with a second local oscillator signal;
    a LOFT correction estimation circuitry configured to determine a DC offset to be added to the transmit signal to cancel LOFT at the first mixer in the transmitter based on measurements on outputs of the second mixer; and
    a LOFT correction circuitry configured to add the DC offset to the transmit signal,
    wherein the LOFT correction estimation circuitry is configured to determine the DC offset based on several measurements obtained by varying the DC offset and/or a phase shift in the second local oscillator signal in the observation receiver.

2. The apparatus of claim 1, wherein the DC offset is varied to be a zero and a non-zero value for the measurements on outputs of the second mixer.

3. The apparatus of claim 1, wherein the phase shift in the second oscillator signal is varied to be zero or 180 degrees for the measurements on outputs of the second mixer.

4. The apparatus of claim 1, wherein the measurements are made on the feedback signal and an inverted feedback signal.

5. The apparatus of claim 1, wherein the first mixer is a quadrature mixer.

6. The apparatus of claim 1, wherein the first mixer is a single sideband mixer.

7. The apparatus of claim 1, wherein the LOFT correction estimation circuitry is configured to determine the DC offset based on average of the measurements on outputs of the second mixer.

8. The apparatus of claim 1, wherein the observation receiver is a main receiver.

9. The apparatus of claim 1, wherein the observation receiver is a separate receiver dedicated for adaptation purpose.

10. A method for cancelling local oscillator feedthrough (LOFT), comprising:
   mixing, by a first mixer in a transmitter, a transmit signal with a first local oscillator signal;
   receiving a fraction of a power of the transmit signal as a feedback signal;
   mixing, by a second mixer in an observation receiver, the feedback signal with a second local oscillator signal;
   determining a DC offset to cancel LOFT at the first mixer in the transmitter based on measurements on outputs of the second mixer; and
   adding the DC offset to the transmit signal,
   wherein the DC offset is determined based on several measurements obtained by varying the DC offset and/or a phase shift in the second local oscillator signal in the observation receiver.

11. The method of claim 10, wherein the DC offset is varied to be a zero and a non-zero value for the measurements on outputs of the second mixer.

12. The method of claim 10, wherein the phase shift in the second oscillator signal is varied to be zero or 180 degrees for the measurements on outputs of the second mixer.

13. The method of claim 10, wherein the measurements are made on the feedback signal and an inverted feedback signal.

14. The method of claim 10, wherein the first mixer is either a quadrature mixer or a single sideband mixer.

15. The method of claim 10, wherein the DC offset is determined based on average of the measurements on outputs of the second mixer.

16. The method of claim 10, wherein the observation receiver is a main receiver.

17. The method of claim 10, wherein the observation receiver is a separate receiver dedicated for adaptation purpose.

18. A non-transitory machine-readable medium including code, when executed, to cause a machine to perform a method of claim 10.

* * * * *